United States Patent Office 2,754,190
Patented July 10, 1956

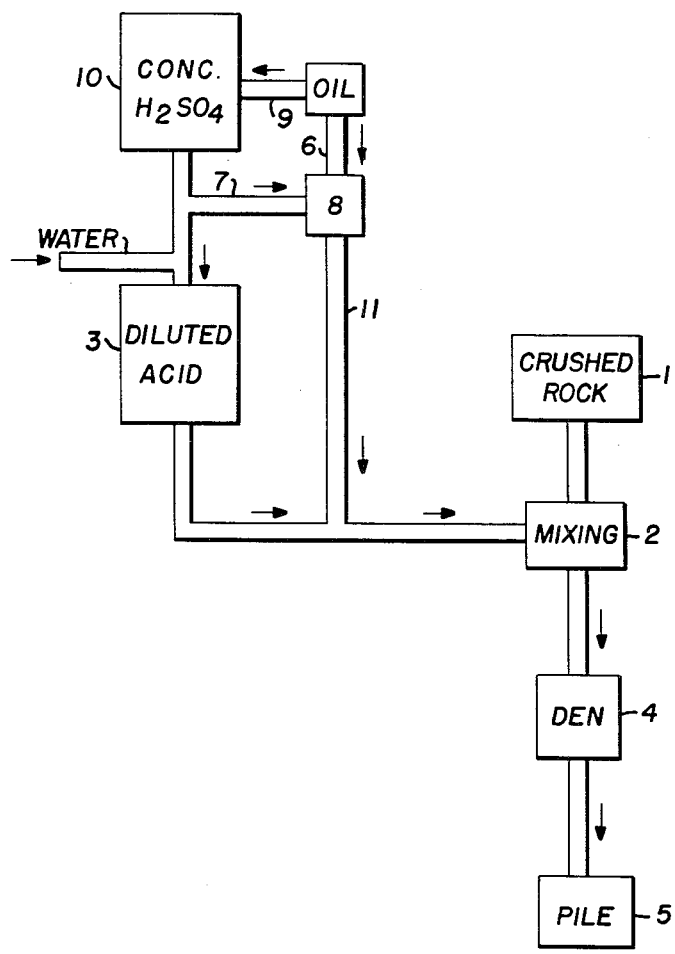
Edwin R. Littmann  Inventor
By Henry Berk  Attorney

2,754,190

PROCESS FOR MAKING PHOSPHATE FERTILIZER ADMIXED WITH A SULFONATED OIL

Edwin R. Littmann, Westfield, N. J., assignor to Esso Research and Engineering Company, a corporation of Delaware Application February 18, 1954, Serial No. 411,054

3 Claims. (Cl. 71—27)

This invention relates to preparation of a super-phosphate fertilizer satisfactorily free of agglomerates by adding high-boiling aromatic hydrocarbon oils to concentrated sulfuric acid used in an early part of the process. Preferably these oils are to be added to a portion of the sulfuric acid initially prepared for treating the phosphate rock.

Super-phosphate is known to be made by the action of sulfuric acid diluted to about 50 to 60° Bé. (62 to about 75% $H_2SO_4$) on tricalcium phosphate of crushed phosphate rock. The super-phosphate is a mixture of monocalcium phosphate and gypsum or calcium sulfate with water of hydration.

The flow diagram in the drawing shows a general sequence of steps for batch and continuous operations.

Referring to the drawing, the crushed and ground phosphate rock, about 100 mesh size or finer, is passed from bin 1 into mixing zone 2 with a measured proportion of cooled and diluted sulfuric acid (about 56° Bé. or 62-71% $H_2SO_4$) from tank 3.

The ratio of acid admixed is about four parts by weight of acid to five of ground rock. After about two or three minutes mixing of the acid with ground rock, the resulting slurry or syrupy mixture is dumped into a den or continuous conveyor apparatus 4 for solidifying. The syrupy mass becomes fairly dry and porous in a few hours at temperatures of 100 to 120° C.

The dry super-phosphate mixture is removed from the den or solidifier to an aging pile 5 for curing over a period of days or weeks.

For a long time efforts have been made to secure super-phosphate type fertilizers which will not take when stored in curing piles or when subsequently packaged in bags or similar containers. The procedure of the present invention which comprises the addition of sulfonic acids derived from catalytically or thermally cracked petroleum oils to the sulfuric acid and the super-phosphate during the course of its manufacture is useful in solving this problem.

Additional advantages, such as the speeding up of the curing step, improving the ease of the cutting out operation or removal of the partially manufactured super-phosphate fertilizer from the den and the formation of a more free flowing and granular finished product are obtained through the practice of this invention.

The present invention also presents a highly economic and low cost method for achieving the desired result in that it is unnecessary to isolate the sulfonic acids produced from low cost cracked petroleum oils.

The sulfonated oils described in the present invention may be added at one of several stages in the manufacturing process. They may be added as a solution in sulfuric acid at the time of mixing the major portion of the sulfuric acid just prior to the dropping of the slurry from the mixing vessel to the den or they may be added in admixture with the total amount of sulfuric acid used in the acidification of the phosphate rock. In any case, the sulfonic acids are prepared by adding the oil used in their manufacture to not less than 10 times its weight of sulfuric acid of at least 85% strength. It has been found that the use of oil in amounts as small as ¼ to 2 lbs. per ton of phosphate rock provides sufficient sulfonic acid to accomplish the purpose of this invention.

EXAMPLE 1

As an example, in the practice of this invention, about 1 to 1½ lbs. of the desired oil is added from line 6 to approximately 10 times its weight of 96% sulfuric acid from line 7 in vessel 8. After mixing the oil with the acid which requires no temperature control when the starting materials are at atmospheric temperature or lower and after agitating the mixture for a period of 1 to 2 hours, the mixture may be allowed to settle and any supernatant oil removed, though this latter step is not essential. The time of mixing is determined by a previous experiment and is sufficient to secure the sulfonation of the major portion of the aromatic hydrocarbon constituents present. The described mixture with or without the accompanying unsulfonated oil and containing the sulfonic acids dissolved in the non-oily phase is added to the cooled and diluted sulfuric acid introduced to the mixing zone in vessel 2.

The solution of sulfonic acids prepared as described above but before addition to the diluted acid may be introduced in the prescribed proportions to the phosphate rock sulfuric acid slurry in the mixing vessel as a separate operation if so desired. Because of the stabilities of the raw materials and of the resultant sulfonic acids, the conditions of the preparation and use of the acids are non-critical and wide variations from the conditions described in the example are permissible.

An investigation of the hydrocarbon oils useable in the process described indicates that the following two properties are desirable.

1. The oils should contain a high proportion of sulfonatable aromatic compounds (preferably 45 to 100%).
2. The oils should contain only a small amount of material (less than about 15%) which forms resins or sludges under the conditions of use with the sulfuric acid.

Typical inspections of oils satisfactory for the practice of this invention are shown in the table.

Typical oils suitable for use in super-phosphate fertilizer manufacture

|  | 1 | 2 | 3 | 4 |
| --- | --- | --- | --- | --- |
| Gravity, A. P. I. | 18.2 | 21.6 | 2.8 | −1.5 |
| Specific Gravity 60/60° F | 0.945 | 0.924 | 1.054 | 1.088 |
| Aromatics, Percent | 64.5 | 48.7 | 84.0 | 92.0 |
| Distillation, ° F.: |  |  |  |  |
| 5% | 509 | 531 | 660 | 641 |
| 10% | 516 | 551 |  | 670 |
| 50% | 537 | 584 | 740 | 776 |
| 90% | 589 | 612 | 840 | 962 |
| 95% | 600 | 620 | 875 |  |

The typical oils indicated boil mainly in the range of 500 to 1000° F. They are commonly known as cycle oils or as heavy cracked distillates. Oils #1 and #2 are obtained by catalytic cracking of petroleum gas oil. Oil #3 is obtained by high temperature thermal cracking. Oil #4 is obtained by thermal cracking of a catalytic cycle oil.

EXAMPLE 2

7½ lbs. of oil of type illustrated was added by line 9 to 4 tons of 96% $H_2SO_4$ in tank 10 and agitated by blowing with air for two hours. There was no appreciable temperature rise with the acid at about 85° F. Thereafter, the acid containing the reactant was diluted to 56 Bé. and cooled to about 85° F. at atmospheric temperature. This cooled diluted acid mixture was added to five tons of ground phosphate rock to make superphosphate by the normal "den method."

The benefits derived from the addition of the sulfonated oil were observed in the subsequent processing of the superphosphate product, including ease of removal from the den, speed of curing and reduction in caking during storage.

EXAMPLE 3

Six pounds of sulfonatable oil of a type illustrated was added to 60 lbs. of 98% $H_2SO_4$ in vessel 8 and agitated there at about 85° F. for 2 hours. The mixture of the resulting sulfonated oil in the acid was then added through line 11 to the crushed phosphate rock simultaneously with addition of cooled and diluted $H_2SO_4$ at such a rate that the sulfonated oil mixture and diluted acid were completely added at about the same time in a mixing vessel 2 to obtain good wetting of the ground rock. This gave the super-phosphate product a desired freedom from agglomeration.

Other steps may be taken to add the described kinds of oils to the acid-ground rock slurry as it is being mixed to aid subsequently in the curing. In practice, the described methods of addition are considered best, particularly for incorporating about 0.5 to 1% by weight of the sulfonated oil in the finished dried fertilizer. By these methods an advantageous action is obtained by the sulfonated oil.

Having described the invention it is claimed as follows:

1. In a process of preparing super-phosphate fertilizer by reacting finely divided tricalcium phosphate rock with diluted sulfuric acid, the improvement which comprises mixing a relatively small amount of an aromatic hydrocarbon oil boiling in the range of 500° to 1000° F. with a concentrated sulfuric acid to sulfonate the oil therein, and adding the resulting sulfonated oil and sulfuric acid mixture with more dilute sulfuric acid to the finely divided rock to be converted to the super-phosphate, said sulfonated oil being present at least in amounts sufficient to inhibit caking of the superphosphate.

2. In a process for preparing a super-phosphate fertilizer by reaction of diluted sulfuric acid with finely divided phosphate rock, the improvement which comprises admixing a relatively small amount of a cracked petroleum heavy distillate oil containing more than 45% aromatics and boiling in the range of 500° to 1000° F. with sulfuric acid of at least 85% strength, agitating the resulting mixture to obtain sulfonation of the oil, diluting the resulting acid mixture containing the sulfonated oil to an acid strength in the range of 62 to 75%, and using the resulting diluted acid mixture for the reaction with the finely divided rock, said sulfonated oil being present at least in amounts sufficient to inhibit caking of the superphosphate.

3. In the process for preparing superphosphate fertilizer by the reaction of dilute sulfuric acid with finely divided phosphate rock, the improvement which comprises admixing a sulfonated oil with said dilute sulfuric acid, said sulfonated oil having been attained by sulfonating a cracked petroleum distillate oil that boils in the range of 500–1000° F., and contains at least 45% aromatic hydrocarbon with at least 10 times its weight of sulfuric acid, having at least 85% strength, said oil containing a relatively small amount of material which forms sludge, the sulfonated oil being used in a proportion of about ¼ to 2 lbs. per 2,000 lbs. of the finely divided rock converted.

References Cited in the file of this patent

UNITED STATES PATENTS

| | | |
|---|---|---|
| 2,067,985 | Sargent | Jan. 19, 1937 |
| 2,418,203 | Stauffer | Apr. 1, 1947 |

FOREIGN PATENTS

| | | |
|---|---|---|
| 469,098 | Canada | Oct. 31, 1950 |
| 365,945 | Great Britain | Jan. 28, 1932 |